(12) United States Patent
Denizot et al.

(10) Patent No.: US 9,883,165 B2
(45) Date of Patent: Jan. 30, 2018

(54) METHOD AND SYSTEM FOR RECONSTRUCTING 3D TRAJECTORY IN REAL TIME

(71) Applicant: EGIDIUM TECHNOLOGIES, Paris (FR)

(72) Inventors: Laurent Denizot, Saint-Arnoult-en-Yvelines (FR); Fernand Alcatrao, Chatou (FR); Rodrigue Favrot, Versailles (FR); Cyril Sepieter, Antony (FR)

(73) Assignee: EGIDIUM TECHNOLOGIES, Orsay (FR)

( * ) Notice: Subject to any disclaimer, the term of this patent is extended or adjusted under 35 U.S.C. 154(b) by 171 days.

(21) Appl. No.: 14/415,366

(22) PCT Filed: Jul. 10, 2013

(86) PCT No.: PCT/EP2013/064541
§ 371 (c)(1),
(2) Date: Jan. 16, 2015

(87) PCT Pub. No.: WO2014/012824
PCT Pub. Date: Jan. 23, 2014

(65) Prior Publication Data
US 2015/0208058 A1 Jul. 23, 2015

(30) Foreign Application Priority Data
Jul. 16, 2012 (FR) .................................. 12 56857

(51) Int. Cl.
*G06T 9/00* (2006.01)
*G06T 19/00* (2011.01)
(Continued)

(52) U.S. Cl.
CPC ..... *H04N 13/0239* (2013.01); *G06K 9/00771* (2013.01); *G06T 5/001* (2013.01);
(Continued)

(58) Field of Classification Search
None
See application file for complete search history.

(56) References Cited

U.S. PATENT DOCUMENTS

2004/0240542 A1* 12/2004 Yeredor ............. G06K 9/00771
375/240.01
2008/0192118 A1* 8/2008 Rimbold ................ H04N 7/181
348/159

(Continued)

FOREIGN PATENT DOCUMENTS

JP 2011049646 3/2011

OTHER PUBLICATIONS

Sebe et al., "3D Video Surveillance with Augmented Virtual Environments", International Multimedia Conference—First ACM Sigmm International Workshop on Video Surveillance, Berkeley, CA, Nov. 2-8, 2003, pp. 107-112.

*Primary Examiner* — Reza Aghevli
(74) *Attorney, Agent, or Firm* — Greer, Burns & Crain, Ltd.

(57) ABSTRACT

A method is for reconstructing a trajectory at a site by a processing server connected to cameras and having access to recordings from these cameras. The server implements a 3D visualization application based on virtual and augmented reality based on a static model of a 3D representation of the site, and a dynamic 3D representation database. The 3D visualization application is configured to determine, in the 3D visualization at a moment T0, the location of an object considered to have been left unattended by an owner, in response to a first instruction from the user, determine at least one camera which is best-positioned for displaying the (Continued)

object, access a recording from the camera to display the object at a moment corresponding to when the object was left unattended by an owner and activate a method for tracking the owner to determine the owner's current location.

11 Claims, 4 Drawing Sheets

(51) Int. Cl.
  *G06T 5/00*     (2006.01)
  *H04N 13/02*    (2006.01)
  *G08B 13/196*    (2006.01)
  *G06K 9/00*     (2006.01)
  *G06T 15/20*     (2011.01)
  *H04N 7/18*     (2006.01)
  *G06T 7/292*     (2017.01)

(52) U.S. Cl.
  CPC .............. *G06T 7/292* (2017.01); *G06T 15/20* (2013.01); *G06T 19/00* (2013.01); *G08B 13/19608* (2013.01); *H04N 7/181* (2013.01); *G06T 2207/30112* (2013.01); *G06T 2207/30232* (2013.01)

(56) References Cited

U.S. PATENT DOCUMENTS

| | | | |
|---|---|---|---|
| 2010/0026802 A1* | 2/2010 | Titus | G08B 13/19608 348/143 |
| 2011/0050896 A1* | 3/2011 | Cobb | G06K 9/00771 348/143 |
| 2011/0115909 A1* | 5/2011 | Sternberg | G01S 3/7864 348/143 |
| 2011/0199487 A1* | 8/2011 | Husoy | G05B 19/418 348/159 |
| 2012/0119879 A1* | 5/2012 | Estes | G08B 13/19641 340/8.1 |
| 2012/0169842 A1* | 7/2012 | Chuang | G08B 13/19619 348/39 |
| 2012/0218416 A1* | 8/2012 | Leny | H04N 7/181 348/159 |

* cited by examiner

METHOD AND SYSTEM FOR RECONSTRUCTING 3D TRAJECTORY IN REAL TIME

BACKGROUND

The present invention relates to a method and a system for reconstructing the trajectory of a person or of a mobile object at a site. In particular, the present invention relates to security management within decision-making centres for sensitive sites such as airports, stadiums, stations or others.

The invention applies advantageously but not exclusively to searching for a person who has left unattended a piece of baggage which may be considered suspect.

At present, in the event of the discovery of a piece of baggage left unattended in a station for example, announcements are made via loudspeakers so that the person who has left their baggage unattended will come and collect it. However, if it has been abandoned deliberately, the owner of the baggage will not appear to reclaim their baggage. Moreover, even in the event of its being abandoned accidentally, the period of time necessary for the owner to appear may be very long. This is detrimental insofar as activities close to where the baggage has been abandoned are interrupted as a precaution until it is established that the baggage is harmless.

The document US 2004/0240542 is known, describing a system of surveillance with several cameras each associated with a method for the automatic detection of a suspect object. In the system described by US 2004/0240542, the data from the cameras are analyzed automatically in real time so as to identify a suspect object for which parameters have been pre-defined. In the event of an alert, the operator plays back the recording so as to identify the object in question: in fact it is the machine which detects and then triggers the alert, the operator must then identify the object.

The document EP 1 975 752 is also known, describing a real-time method making it possible to identify the best-positioned camera. However this real-time method requires identification of the object at the outset, and then determination of the camera that is best-positioned with regard to its orientation towards the object in question.

A purpose of the present invention is to reduce the time searching for the owner of an object in a location comprising a video surveillance system.

Another purpose of the invention is to provide an effective, unified tool that is simple to use, in order to identify an owner.

SUMMARY

At least one of the abovementioned objectives is achieved with a method for reconstructing a trajectory at a site by means of a processing server connected to a set of cameras and having access to the video recordings from these cameras. This processing server implements a 3D visualization application based on virtual reality and augmented reality based on:

a static model of a 3D representation of the site, and
a dynamic 3D representation database.

According to the invention, the 3D visualization application is configured in order to:

determine, in the 3D visualization at a moment T0, the location of an object considered to have been left unattended at the site by an owner, in response to a first instruction from the user, determine at least one camera which is best-positioned for displaying said object, access a video recording from this camera so as to display the recording at a moment t preceding T0, t is determined in response to a second instruction corresponding to the moment when the object was left unattended by an owner, activate a method for tracking the owner via the recordings from the different cameras from the moment t to the present moment so as to determine the current location of said owner.

With the method according to the invention, when an object is left unattended at a site monitored by surveillance cameras, the owner of the object left unattended can now be found quickly. At sensitive sites such as airports, such a method makes it possible to quickly apprehend the owner of a piece of baggage left unattended in order to verify whether it is a matter of a genuine oversight or a dangerous act.

The location of the object can be determined from a click by the user on a screen displaying the 3D visualization of the site. The user may have received information on the situation of the object via a call from a security officer. The location of the object can also be determined from GPS ("Global Positioning System") coordinates or coordinates from a system for location inside buildings, received in the processing server. These coordinates would be transmitted by a security officer from, in particular, a portable device such as a mobile phone or a "smartphone". Preferably, the cameras form part of a video surveillance system incorporating other sensors.

The method according to the invention offers a 3D visualization as well as an aid to multidimensional decision-making in real time. It is thus possible to detect an incident, remove a doubt, contain a threat or take action within a few seconds instead of several minutes as previously.

The processing server uses the static model of a 3D representation of the site and the dynamic 3D representation database so as to determine the best-placed camera. The 3D representation makes it possible in particular to take into account walls and other obstacles. It is thus possible to know whether or not a person is situated in the field of view of a camera. The dynamic database can comprise dynamic data relating to:

the movements of the cameras,
the different clicks made by the user,
the trajectory being monitored,
the coordinates,
the time line,
etc.

With reference to the known prior art, combining the documents US 2004/0240542 and EP 1 975 752 does not make it possible to arrive at the invention because, in the present invention, the operator identifies the object, the best-positioned camera is determined, then the recording from this same camera is played back. In US 2004/0240542, the recording is played back without the object being identified by the operator.

According to the invention, the tracking method allows direct playback of the videos in which the owner is visible, passing from one video to another when the owner leaves the field of view of the video (recording) during playback. This transition takes place each time, determining the best-positioned camera.

According to an advantageous feature of the invention, the selection of the best-positioned camera can be made as follows:

determination of the three-dimensional coordinates of a point of impact of the owner with the ground, based on a click made on a 2D monitor displaying a recording being viewed, calculation of the three-dimensional coordinate of a point of impact of the owner with the ground in the 3D visualization based on a bijective function between the 3D visualization and the 2D monitor, and determination of the best-positioned camera based on this three-dimensional coordinate, then display of the recording from the best-positioned camera in order to continue tracking.

The present invention is in particular, but not exclusively, remarkable in that by clicking on the point of impact with the ground, the position along the "z" axis is in fact fixed, this position corresponds to the ground. Thus with the x,y,z coordinates, it is possible for a person skilled in the art to find a bijective function making it possible to link the 2D video display on a monitor and the 3D visualization.

By way of non-limitative example, an algorithm describing a bijective function can be defined as follows:

Bijective function 3D coordinates<->2D camera coordinates
    f: Camera reference mark->3D reference mark
    f−1: 3D reference mark->Camera reference mark
    (u, v) standardized coordinates of the 2D point in the video window
    (X, Y, Y) coordinates of the 3D point in three-dimensional space
    f(u, v, Camera reference mark, 3D reference mark, 3D static model, 3D dynamic model)->X,Y,Z
        Calculate3Dposition(u, v, camera reference mark, 3D reference mark)->U, V
        CalculateIntersection(U, V, 3D static model, 3D dynamic model)->X, Y, Z
    f−1(X, Y, Z, 3D reference mark, Camera reference mark, 3D static model, 3D dynamic model)->U, V
        If (X, Y, Z) is in camera field (Camera reference mark)
        Then
            CalculatePosition2D(X, Y, Z, 3D reference mark, camera reference mark, u, v)
        End if A click on the monitor makes it possible to have three-dimensional positioning in the 3D visualization. The transition to 3D representation makes it possible to take obstacles into account and efficiently calculate the best-positioned cameras.

According to an advantageous feature of the invention, the best-placed camera is determined by calculating the d/f ratio of each camera, d being the distance between the camera in question and the three-dimensional coordinate of a point of impact of the owner with the ground, f being the focal length of the camera in question. By the expression "the best-positioned camera", is meant a camera having the owner in its field of view and having the smallest d/f ratio. It is possible to have a ranking of several cameras and display not only the best-positioned camera but several among those which are best-positioned.

According to an embodiment, the focal length and the position of the cameras can remain unchanged over time. This reduces the dynamics of the cameras since the cameras are fixed. However, it makes it possible to simplify the calculations of the d/f ratio since the focal lengths of each camera can be predetermined and saved in a memory space. For example, in order to further simplify the calculations, the focal length can be identical for all the cameras.

According to another embodiment, the processing server can also recover data relating to the dynamics of the focal length and orientation of the cameras so as to calculate the d/f ratio. In this case, the processing server is permanently connected to the cameras and continuously receives characteristic data from each camera.

Advantageously, the 3D visualization and the monitors are integrated on the same display screen. The monitors can be video windows overlaid on a screen having the 3D visualization in the background. A click by the user in one of the video windows makes it possible to obtain the corresponding three-dimensional position in the 3D visualization. Preferably, the display screen is of the touch-screen type.

According to an advantageous feature of the invention, during the tracking method, the recordings can be read at a speed greater than the normal recording speed. In fact, in order to achieve the video display in real time and determine the current location of the owner, the video recordings are read at a speed greater than normal speed. These recordings can be made on digital storage media allowing "time-shift" management.

Moreover, once the current location of the owner is determined, their coordinates are transmitted wirelessly to remote mobile terminals.

According to the invention, the first instruction can originate from a cursor which can be moved by the user along a time line displayed in the 3D visualization. This time cursor provides a reference system with respect to which all the recordings are positioned.

According to another aspect of the invention, a system is proposed for reconstructing a trajectory at a site by means of a processing server connected to:
    a set of cameras and having access to the video recordings from these cameras,
    a static model of a 3D representation of the site, and
    a dynamic 3D representation database.

This processing server implements a 3D visualization application based on virtual reality and augmented reality so as to:
    determine, in the 3D visualization at a moment T0, the location of an object considered to have been left unattended at the site by an owner, in response to a first instruction from the user,
    determine at least one camera which is best-positioned for displaying said object,
    access a video recording from this camera so as to display the recording at a moment t prior to T0, t is determined in response to a second instruction corresponding to the moment when the object was left unattended by an owner,
    activate a method for tracking the owner via the recordings from the different cameras from the moment t to the present moment so as to determine the current location of said owner.

DESCRIPTION OF THE DRAWINGS

Other advantages and features of the invention will become apparent on examination of the detailed description of an embodiment which is in no way limitative, and the attached drawings, in which.

DETAILED DESCRIPTION

Although the invention is not limited thereto, a description follows of a method for recognizing the trajectory of a person having left a piece of baggage unattended at a place in an airport. The invention can be applied to any method for recognizing a trajectory at a site comprising a video surveillance system.

Figure 1:
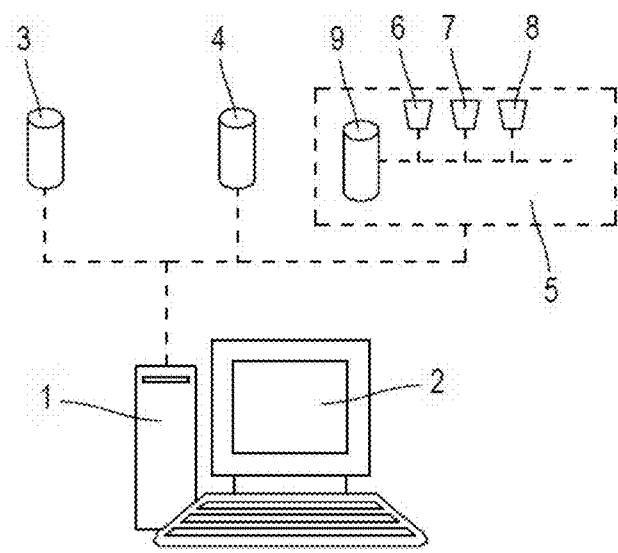
FIG. 1 is a general simplified view of the recognition system according to the invention.

FIG. 1 shows a processing server 1 provided with hardware and software components allowing the implementation of a 3D visualization application. The hardware components comprise in particular memory components referred to as RAM and ROM, one or more microprocessors or microcontrollers, one or more graphics cards, one or more network cards, and input/output means. This processing server is associated with a display screen displaying as background a 3D visualization of an area of the airport. The 3D visualization application is carried out based on a static model 3 of a 3D representation of the airport, this model being saved in a database. This static model comprises a representation of the structure of the airport, the walls, staircases, etc. A dynamic 3D representation database 4 of is also used. This database contains data relating to the movements of the cameras, the different clicks made by the user, the data relating to the trajectory being monitored, the coordinates as well as data on the time line. The assembly therefore makes it possible to prepare a 3D representation, part of which is displayed on the screen 2.

The processing server 1 is also connected to a video surveillance system 5 of the airport. This may be an existing video surveillance system to which the processing server has been connected. It is generally possible to provide other systems such as an anti-intrusion system, an access control, geolocation or communication system. Advantageously, this video surveillance system comprises a plurality of cameras 6, 7 and 8 distributed throughout the entire airport in very precise areas. These cameras are connected to a database 9 containing video recordings from these cameras. It is possible to envisage a recording on a sliding window, i.e. only for example 24 hours of video are retained so as not to fill up the available memory space. The database 9 can comprise digital storage media automatically erasing any recording more than 24 hours old. Each direct recording or video from each camera can be displayed on a monitor, i.e. a video window overlaid on the display screen 2.

The processing server 1 is able to send instructions to the video surveillance system to recover video recordings.

Figure 2:
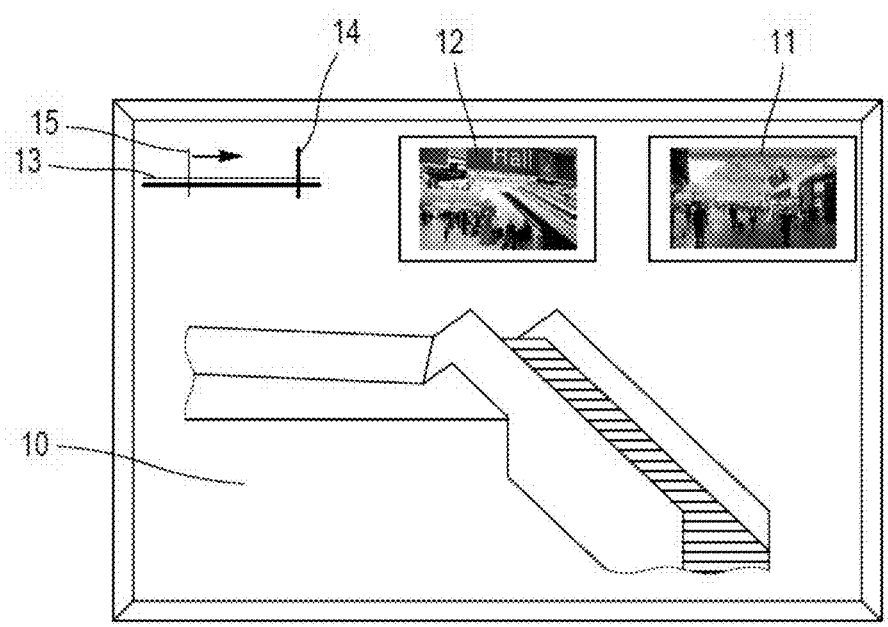
FIG. 2 is a simplified view of a 3D visualization incorporating two video monitors according to the invention.

FIG. 2 shows the display screen 2 having as background 10 a 3D visualization and two monitors 11 and 12 showing video originating from two cameras of the video surveillance system 5.

The 3D visualization application implemented by the processing server is of the augmented reality type. This is a software package in which all the security information is spatialized and standardized, providing real-time decision support and effective operational management of resources.

The monitors 11 and 12 display the 2D video in which the mouse-click function is taken into account. The 3D visualization application comprises a bijective function between the 2D videos displayed and the background 3D visualization. A click on a 2D video makes it possible to determine the corresponding position in the 3D visualization.

Figure 3:
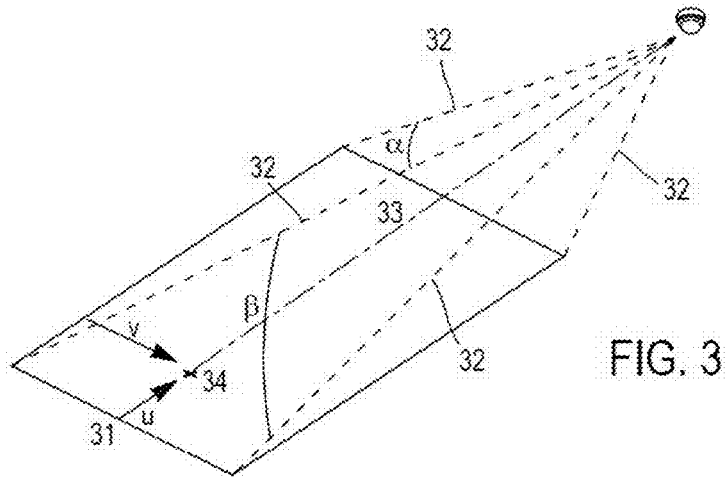
FIG. 3 is a diagram illustrating a projection of the field of view of a camera on the ground.

An example of a bijective function between a camera view and the 3D reference mark can be defined from the projection of FIG. 3:

f: Camera reference mark->3D reference mark

The solid rectangle 31 represents the projection of the camera view on the ground.

The dotted lines 32 represent the camera's visibility cone with respect to the 3D: it is defined by a direction vector DC moving from the camera to the central point seen by the camera and two angles $\alpha,\beta$ dependent on the focal length and corresponding to the two axes for $\{u;v\}=\{1;1\}$.

The direction 33 is obtained with respect to DC and $\{u.\alpha,v.\beta\}$.

The coordinates (x,y,z) of the point 34 clicked on the 2D image are obtained by the intersection of the direction 33 with the plane representing the ground.

f–1: 3D reference mark->Camera reference mark

If the point (X,Y,Z) is in the field of view of the camera, the coordinates (u,v) are obtained by projecting the point into the reference mark of the camera.

FIG. 2 also shows a time line 13 with a first cursor 14 representing the present time and a second cursor 15 representing past time. Preferably, the monitors 11 and 12 display video recordings corresponding to the moment in time of the second cursor. This second cursor can be moved by the user so as to navigate in time. The method according to the invention is a decision support tool for a security-safety operator because it allows:

the analysis and restitution in four dimensions (space-time) of the information originating from the cameras and security systems, the combining of data originating from sources of information of different kinds or from third-party software (geolocation and video, anti-intrusion and video, multiple detections having space-time correlations etc.), the calculation of evacuation or intervention routes as a function of the dynamic 3D model (opening-closing of access), and the incorporation of security-safety procedures into the management of incidents and the issuing of alert bulletins.

A description now follows of an example of implementation of the method according to the invention for searching for an owner having left a piece of baggage unattended in an area inside an airport.

The following terminology is used below:

Baggage left unattended: packages, pieces of baggage, parcels, goods, bags which no longer seem to be under their owner's supervision, and which have been the subject of an alert. A piece of baggage is considered to have been left unattended for 10 minutes starting from the alert declaration. It then takes on the status of abandoned baggage if its owner has not been found within these 10 minutes.

Abandoned baggage: packages, pieces of baggage, parcels, goods, bags which turn out to be no longer under their owner's supervision when they are situated in zones where abandonment may result in an official fine. A security service assumes responsibility for abandoned baggage, and it is surrounded by a security perimeter.

Suspect baggage: this is a piece of abandoned baggage the owner of which has not been found, and which is considered dangerous by the bomb-disposal experts after analysis.

owner: the person who has left unattended or abandoned a piece of baggage.

Left zone: the place where the baggage left unattended is situated.

Search zone: zone modelled in 3D, in which the operator can carry out a search for owners of abandoned baggage.

Incident: an incident is an event which appears as a half-sphere located in 3D around the location of the incident. The incident makes it possible to symbolize and locate the abandoned baggage in the 3D scene. The incident is generated by the event "baggage left unattended". An incident is a structured item of data, all the changes of state of which are recorded.

Video tag: a video tag is a space-time label created from a click in a video. This label is represented graphically in 3D for the reconstruction of the trajectory.

The 3D visualization application makes use of a 3D representation of the environment to be secured. A distinction is made between two zones: the left zone and the search zone. The left zone is greatly affected by the abandonment of baggage. In order to facilitate the search for owners of abandoned baggage, the operator has available 3D modelling of an area wider than the left zone: the search zone. This zone comprises:
   level 0 (Arrivals) containing the left zone,
   level 1 (Departures)
   level −1,
   the immediate outer periphery of the building.

The modelling of these 3 levels allows the operator to track an owner on several levels and increases the chances of finding them within a specified time of for example 10 minutes. This is disclosed by way of example, the number of levels is not limitative.

In particular, all the cameras observing entrances to and exits from zones and changes of level (staircases and escalators) are taken into account.

Figure 4:
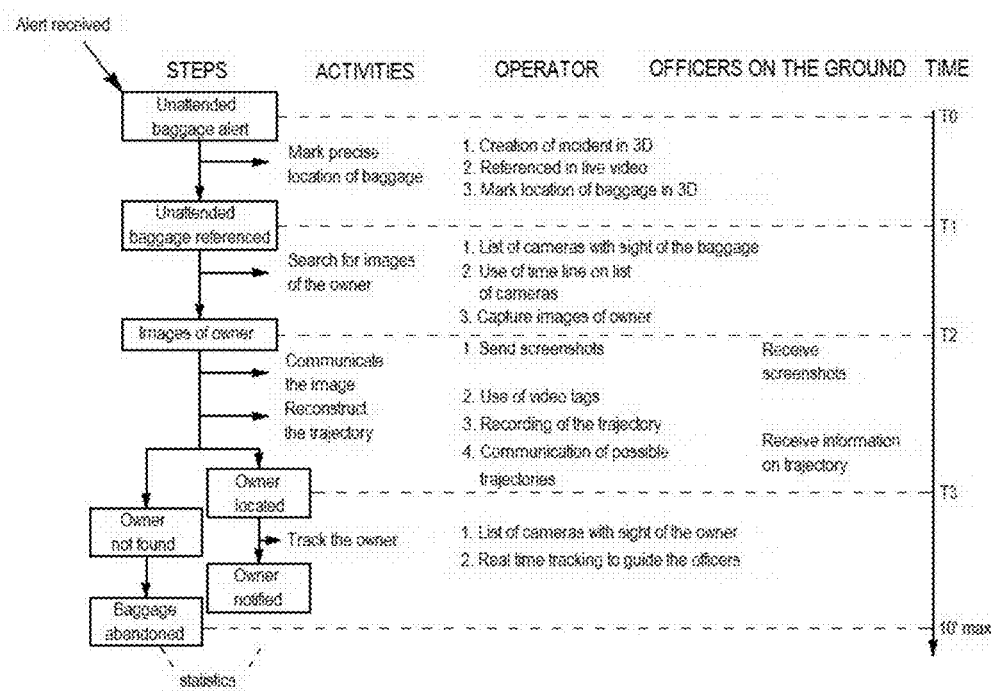
FIG. 4 is a graph showing the steps and actions implemented in a method for tracking a person in real time.

The search procedure is presented by a graphic in FIG. 4.

The graphic is divided into 5 parts:
   The steps (baggage left unattended, baggage referenced etc.)
   The activities carried out between two steps
   The main actions carried out by the operator using the 3D visualization application
   The information received by the officers present on the site
   A time line indicating the specified time limits.

As shown in the graphic of activities in FIG. 4, the three activities which take place consecutively in order to find the owner are:
   Identifying the owner
   Locating the owner
   Tracking the owner In step 1, the baggage left unattended is located. The event giving rise to this step is the reception by the operator of an alert via an alert system or by any other means. The operator can receive this alert either directly in the 3D scene (sound alarm for example) or on a smartphone.

The operator's activity is to mark the precise location of the baggage in the 3D visualization. For this purpose, the operator creates an incident in the 3D scene based on the information contained in the alert message. The more precise this information, the greater the precision with which the operator can position the location of the abandoned baggage.

It is possible to automatically generate an incident based on the alert message. In fact, if the alert message is formatted, it is possible to automatically position an incident at the location indicated in the message.

Figure 5:
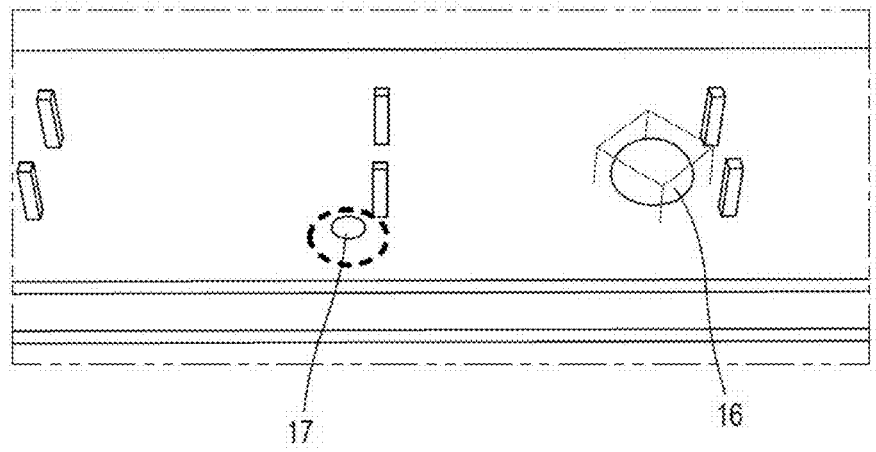
FIG. 5 is a simplified view of a representation of an incident in a 3D visualization.

The creation of an incident is a rapid operation carried out for example using a keyboard shortcut. An example of a representation of an incident in 3D modelling is illustrated in FIG. 5. An incident bubble is shown 16 representing a left zone beside two posts. A location 17 of the owner is also shown.

The incident is recorded in the dynamic database with its space-time and information coordinates. The creation of the incident makes it possible to record the time (T0) which will serve as a reference for determining the 10 minutes devoted to searching for the owner.

At this step, the incident is located. The operator will then display the videos streams from the cameras viewing the location of the incident. This operation allows him, on the one hand, to take note of the actual situation and, on the other hand, to ensure that the incident that he has positioned in 3D does correspond to the exact location of the abandoned baggage.

The 3D visualization application has a function making it possible to determine by a simple click the cameras which are best-positioned for viewing the selected point. The obstacles which have been modelled in 3D (pillars, walls, panels etc.) are taken into account in order to determine if the object is really visible to a camera.

The operator applies this function to the incident previously created. He obtains a list of cameras. He can then select one or more cameras and display the corresponding video streams. Depending on the degree of aperture of the video sub-system, the video windows are displayed on screen 2 or on another screen.

After verification on the video, the operator marks the precise location of the incident. For this purpose, if appropriate, he moves the incident bubble then describes the incident:
   He names the incident by describing the abandoned baggage; for example: red suitcase.
   He adds a comment: baggage referenced.

The 3D visualization application processes this information as events which are recorded in a dynamic database with their space-time coordinates.

The baggage left unattended being referenced, the activity of the operator then consists of identifying the owner.

This identification is based on the following principle: the operator knowing the list of the cameras which can see the abandoned baggage, can examine the video recordings associated with these cameras, find the precise moment when the baggage was abandoned and find the owner.

In order to identify the owner, the display application makes available to the operator a "time-line" function corresponding to the display of the time line 13. This function allows the operator to make use of the video recordings from the cameras that he has previously selected. He can reposition them in time and obtain a useable image of the owner using the video history.

The "time line" function makes it possible to synchronously reposition the recordings from all the cameras selected.

The activity of the operator then consists of:
   Communicating the image of the owner
   Reconstructing the trajectory of the owner
   Communicating the trajectory of the owner Initially, the operator communicates the screenshot or screenshots in order to provide the officers on the ground with the first information allowing them to identify the owner.

In order to aid the reconstruction of the trajectory, the 3D visualization application makes a video tag function available to the operator. When the operator clicks in the video recording from a camera, the software package carries out the following actions:
- it causes the point corresponding to the area selected in the video to appear in the 3D,
- this tag then appears in all the views from the cameras which can see this tag (augmented reality).

FIG. 5 is a diagrammatic view illustrating the appearance of a video tag.

The video tag function makes it possible to aid the reconstruction of the trajectories of the owner using the following features:
- the tag is applied by means of a keyboard shortcut using a mouse and a touch key,
- the time at which the image was taken is associated with each video tag,
- the video tag function links two successive tags in the 3D visualization, which provides the operator with a trajectory as the video recordings are utilized.

Figure 6:
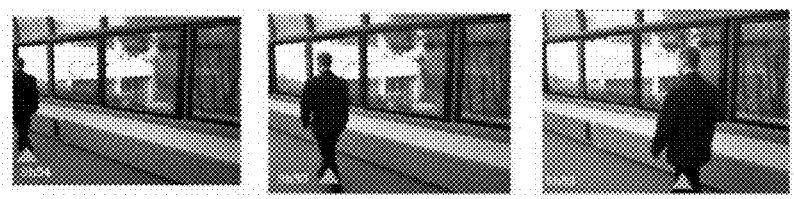
FIG. 6 is a simplified view illustrating a 3D visualization in the lower half and three monitors displaying video recordings.
Figure 6:
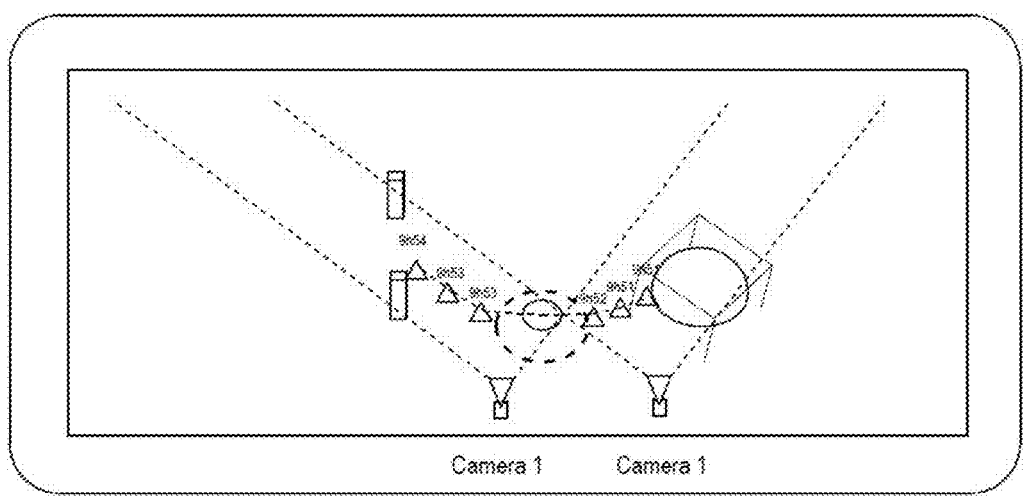

When the owner moves, he finally leaves the field of view of the camera. In this case, the operator uses the immediate selection function of the cameras by clicking on the owner's foot so as to mark its point of impact with the ground: the system is responsible for providing the operator with the list of the cameras. He can thus select another camera and continue the reconstruction of the trajectory. The diagram in FIG. 6 provides an illustration of this operation: the operator then uses the video tag on the video recording from one of the cameras, for example camera 1 on the left, by clicking on the foot of the person visible on the screen, in order to continue to reconstruct the trajectory.

This operation is iterative. Very rapidly, it can provide significant indications which will make it possible to guide the searches. Example of indications: the owner has taken the escalator situated at the gate G in order to descend to level −1; the owner has headed towards the shop "R" etc.

As soon as there are sufficient trajectory indicators, the operator can transmit them to the security officers deployed in the south terminal.

The work of reconstruction of the trajectories has the objective of finding the owner's location at the present moment. It is nevertheless possible that the work carried out by the operator does not make it possible to locate the owner, for various reasons:
- the owner has left the search zone,
- the operator has not been able to reconstruct the trajectory.

In this case, if the time limit of 10 minutes has passed, the baggage left unattended will become a piece of abandoned baggage and treated as such. The operator will however be able to continue the search beyond these first 10 minutes.

If the owner is located, this closes the incident, an operation carried out manually by the operator who adds a comment in the Incidents window.

A description now follows of an alert process from the processing server to remote devices. These alerts are exchanges of information between the operator and officers deployed in the airport. In order to promote these exchanges, the 3D visualization application is interfaced with smartphones on the ground.

These exchanges comprise:
Sending information about the owner. As soon as the operator has identified the owner, he communicates one or more screenshots produced from the video recordings and sends them securely to the officers on the ground with a smartphone identified on the system in order to allow them to identify the owner.

The smartphone regularly sends the system messages making it possible to geolocate the officer in order to guide him in a better fashion.

Information on the trajectory of the owner is sent as it is reconstructed. These transmissions will be made in the form of messages containing brief comments.

Figure 7:
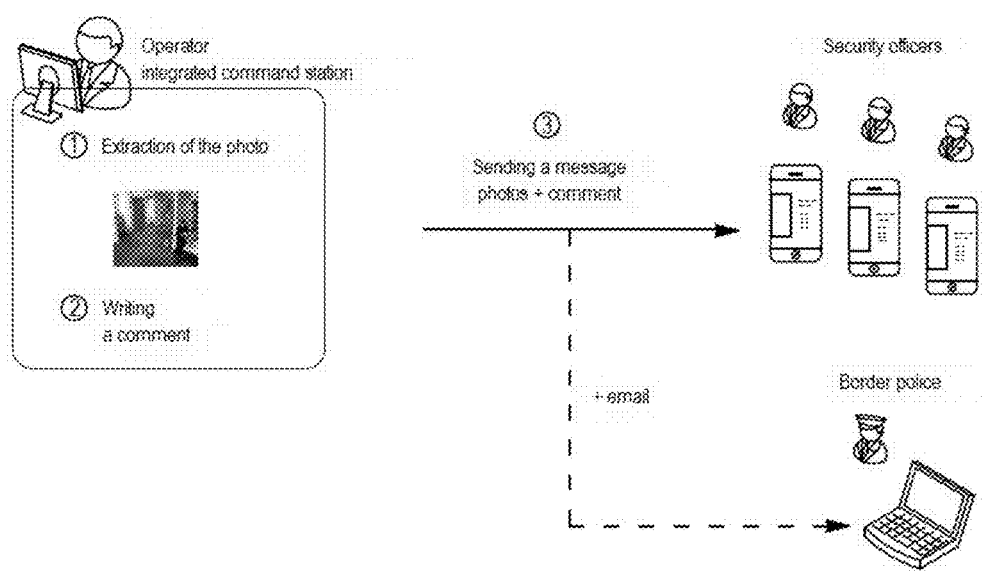
FIG. 7 is a simplified diagrammatic view illustrating the sending of information to remote devices.

FIG. 7 shows an example of the transmission of information regarding the owner from the processing server to the security officers and in particular to the border police. In step 1, a photo is extracted from a monitor and the operator writes a comment in step 2. The photo and the comment are transmitted via a mobile network to the multimedia telephones ("smartphones") of several security officers present on the site. This photo and the comment are transmitted in the form of an encrypted message to these officers who are searching for the owner. The comment can contain information on the location or the trajectory followed by the owner. The photo is time-stamped.

In other words, in order to transmit a message, in the human-machine interface of the 3D visualization, the operator has a function allowing him to:
- Produce a screenshot from the video recordings,
- Write a comment in a window,
- Click on a send button in order to transmit the set of "Photo+comments" to the other people with a dedicated smartphone.

It is also possible to envisage the transmission of an email from the processing server.

Generally, the 3D visualization application is designed on a database which records in four dimensions (space and time) all the events and changes of state linked to a security-safety operation.

In the case of problems with abandoned baggage, the table below describes a non-exhaustive example of events which will occur.

| Event or information in the management of the "Baggage left unattended" incident | Processing in the processing server |
|---|---|
| The time and date when the baggage was found | At the time when the baggage is found, a "Baggage left unattended" incident is created. The time of creation of the incident is recorded. |
| Precise zone where the baggage was found | At the moment of the creation of the "Baggage left unattended" incident, an incident bubble is created in the "estimated" zone of the presence of the baggage. This initial position is recorded in the database attached to the incident in question. Any change in position of the incident is recorded up to the precise position, via a video click on the referenced baggage. |
| The time of the end of processing | The time of the end of processing is the closing time of the incident. This time is recorded in the dynamic database. |
| The person who has found the baggage | When the "Baggage left unattended" incident is created the name of the person who has found the baggage is recorded in one of the information fields attached to the incident. |
| Conclusion: recovered by the owner, manual processing etc. | When the incident is closed, the conclusion is recorded in one of the information fields attached to the incident. This field can be predefined or of free text type depending on the operator's choice. |

| Event or information in the management of the "Baggage left unattended" incident | Processing in the processing server |
| --- | --- |
| The cameras which have recorded the baggage | The cameras which have recorded the baggage are automatically recorded in the dynamic database. |

Of course, the invention is not limited to the examples which have just been described and numerous adjustments can be made to these examples without exceeding the scope of the invention.

The invention claimed is:

1. A method for reconstructing a trajectory at a site by means of a processing server connected to a set of cameras and having access to the video recordings from these cameras, the method comprising:
  implementing a 3D visualization application by the processing server, wherein the 3D visualization application is based on virtual reality and augmented reality based on:
    a static model of a 3D representation of the site; and
    a dynamic 3D representation database;
  wherein the 3D visualization application is configured to:
    determine, in the 3D visualization at a moment T0, the location of an object considered to have been left unattended at the site by an owner, in response to a first instruction from the user;
    select at least one camera which is best-positioned for displaying said object, wherein the selection of the best-positioned camera comprises:
      determining three-dimensional coordinates of a point of impact of the owner with the ground based on a click made on a 2D monitor displaying a recording currently being viewed;
      calculating the three-dimensional coordinates of the point of impact of the owner with the ground in the 3D visualization based on a bijective function between the 3D visualization and the 2D monitor, and
      determining the best-positioned camera based on the calculated three-dimensional coordinates,
    access a video recording from the determined best-positioned camera so as to display the recording at a moment t prior to T0, t is determined in response to a second instruction corresponding to the moment when the object was left unattended by an owner; and
    activate a method for tracking the owner via the recordings from the different cameras from the moment t to the present moment so as to determine the current location of said owner.

2. The method according to claim 1, wherein the best-positionedcamera is determined by calculating a d/f ratio of each camera, d being the distance between the camera in question and the three-dimensional coordinates of the point of impact of the owner with the ground, f being the focal length of the camera in question.

3. The method according to claim 2, wherein the focal length and the position of the cameras remain unchanged over time.

4. The method according to claim 1, wherein the focal length is identical for all the cameras.

5. The method according to claim 2, wherein the processing server also recovers data relating to the dynamics of the focal length and orientation of the cameras so as to calculate the d/f ratio.

6. The method according to claim 1, wherein the 3D visualization and the monitors are integrated on the same display screen.

7. The method according to claim 6, wherein the display screen is of the touch-screen type.

8. The method according to claim 1, wherein, during the tracking method, the recordings are read at a speed greater than the normal recording speed.

9. The method according to claim 1, wherein, once the current location of the owner is determined, the owner's coordinates are transmitted wirelessly to remote mobile terminals.

10. The method according to claim 1, wherein the first instruction originates from a cursor capable of being moved by the user along a time line displayed in the 3D visualization.

11. A system for reconstructing a trajectory at a site by means of a processing server connected to:
  a set of cameras and having access to the video recordings from these cameras,
  a static model of a 3D representation of the site, and
  a dynamic 3D representation database,
  said processing server implements a 3D visualization application based on virtual reality and augmented reality so as to:
    determine, in the 3D visualization at a moment T0, the location of an object considered to have been left unattended at the site by an owner, in response to a first instruction from the user;
    determine at least one camera which is best-positioned for displaying said object, wherein the selection of the best-positioned camera comprises:
      determining three-dimensional coordinates of a point of impact of the owner with the ground based on a click made on a 2D monitor displaying a recording currently being viewed;
      calculating the three-dimensional coordinates of the point of impact of the owner with the ground in the 3D visualization based on a bijective function between the 3D visualization and the 2D monitor, and
      determining the best-positioned camera based on the calculated three-dimensional coordinates,
    access a video recording from this camera so as to display the recording at a moment t prior to T0, t is determined in response to a second instruction corresponding to the moment when the object was left unattended by an owner; and
    activate a method for tracking the owner via the recordings from the different cameras from the moment t to the present moment so as to determine the current location of said owner.

* * * * *